Jan. 12, 1960    J. K. HUBBARD    2,920,992
ARTICLE OF COMMERCE
Filed Sept. 22, 1954

INVENTOR
JAMES K. HUBBARD

BY Carl A. Hechmer
ATTORNEY

United States Patent Office 2,920,992
Patented Jan. 12, 1960

2,920,992
ARTICLE OF COMMERCE

James K. Hubbard, West Chester, Pa., assignor to E. I. du Pont de Nemours and Company, Wilmington, Del., a corporation of Delaware Application September 22, 1954, Serial No. 457,582

9 Claims. (Cl. 162—157)

This invention relates to a novel article of commerce and to a process for its preparation. More particularly, it is concerned with a paper-like pellicle of a mass of self-bonded, molecularly oriented fiber, produced from a linear synthetic polymer of acrylonitrile.

By the expression ". . . fiber produced from a linear synthetic polymer of acrylonitrile" is meant any filament, yarn, staple, floc or the like of any polymer of acrylonitrile including polyacrylonitrile (i.e., the homopolymer) wherein the acrylonitrile component constitutes about 85% or more of the polymer molecule calculated as $CH_2$—$CH$=$CN$. Among the compounds that may be copolymerized with acrylonitrile may be mentioned 2-vinyl or 4-vinyl pyridine, 5-ethyl-2-vinyl pyridine and 2- or 4-vinyl quinoline. Such copolymeric materials are shown in United States Patent No. 2,491,471 to H. W. Arnold dated December 20, 1949. Suitable materials are also illustrated in United States Patent No. 2,436,926 to R. A. Jacobson dated March 2, 1948.

The failure of synthetic fibers to replace cellulose to any appreciable extent in the past in the manufacture of paper-like structures despite the inherent desirable properties of the synthetic fibers such as high wet strength, toughness, chemical durability, excellent dimensional stability and the like, is due largely to the inability of such synthetic fibers to fibrillate, thus rendering them unsuitable for fabrication upon conventional commercial paper-making equipment. Furthermore, in the case of fiber produced from a linear synthetic polymer of acrylonitrile, it is not possible by fusion methods to bond the reticulated mass. As the temperature at which the bond is attempted is raised, a sudden transition range is reached at which the previously infusible fibers exhibit a high degree of plastic flow accompanied by a discoloring degradation. The product is a brittle film-like material of yellow color. On the other hand, the use of organic solvent bonding is not adaptable to fabrication upon a paper-making machine due to the necessity for solvent recovery, toxicity complications and the like. Other attempts to form such a product have employed various bonding agents to join the crossed fibers in the matter structure. Such a product is limited in its properties by the chemical and physical characteristics of the bonding agent itself and also the adhesive power of the bond for the fiber. Furthermore, when high temperature is required to apply the bonding agent, molecular alignment of the fiber suffers.

It is an object of the present invention to provide a paper-like pellicle of a self-bonded, molecularly oriented fiber mass produced from a linear synthetic polymer of acrylonitrile.

Another object is to provide a process for the preparation of such a paper-like pellicle adaptable to conventional paper-making equipment.

A further object is to prepare a paper-like pellicle suitable for use in the filtering of strong, hot acids or solutions containing such acids.

These and other objects will become apparent in the course of the following specification and claims.

In accordance with the present invention a paper-like pellicle of a mass of self-bonded, molecularly oriented fiber produced from a synthetic, linear polymer of acrylonitrile is formed by supplying an aqueous solution of a join-inducing salt, to be described hereinafter, to the surface of the fibers either prior to matting or in a matted form, thereby forming a water-leaf and heating to remove water. The resulting paper-like pellicle is self-bonded, i.e., a true joining of fibers and/or filaments at points of intersection is attained without the presence of an added adhesive. Since the joining occurs at a relatively low temperature, the fibers retain molecular alignment. Removal of water from the water-leaf is accomplished in the manner conventional to paper-making without modification of a paper-making machine. Furthermore, the action of the join-inducing salt is a surface phenomenon concentrated at the points of contact of the crossing fibers, thereby not substantially affecting the greater portion of the fiber structure. Pressure may be applied during the joining operation to increase compactness of the final product. After formation, the pellicle may be washed free of the join-inducing salt. The product being unitary, self-bonded and molecularly aligned, is both tough and flexible. When employed as a filter paper, the product may be used in filtering solutions containing strong acids which would degrade cellulosic and other conventional papers.

The invention will be more readily understood by reference to the drawings.

Figure 1:
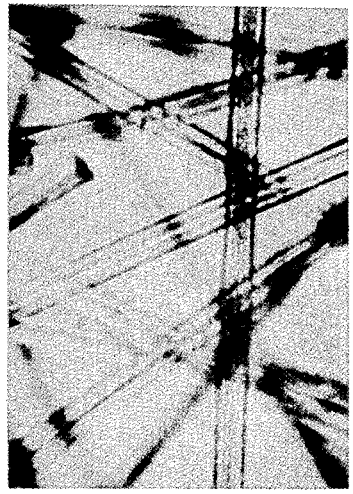
Figure 1 is a photomicrograph of a fragmentary section of a batt of molecularly oriented fibers produced from a polyacrylonitrile polymer.
Figure 2:
Figure 2 is a photomicrograph of a fragmentary section of a paper-like pellicle produced from the mass of fiber of Figure 1 of the present invention.

In Figure 1, a typical section of a batt of randomly disposed polyacrylonitrile staple is shown. After treatment of the batt in accordance with the present invention a join of the fibers at their points of intersection occurs by virtue of self-bonding, i.e., without benefit of an adhesive, as is shown in the photomicrograph of Figure 2.

In general the mechanics of the process described herein are analogous to those of paper-making. Thus the process is readily adaptable to conventional paper-making equipment, although not limited thereto. In one embodiment a batt of fibers is formed on a moving screen. Since the fiber stock can be added from a liquid suspension, the Fourdrinier machine is convenient for this operation. The join-inducing salt can be added to the mixer or showered upon the batt after its formation on the endless screen. Adequate heat and pressure for the join occurs within the felt-drying blanket at the dryer rolls. For the production of a low porosity product, additional heat and pressure may be supplied by passing the batt through a heated calender roll. The salt may be removed by a water wash at the usual sizing station or the joined mass may be passed through a wash tank. Manufacture may also be performed on the cylinder paper machine by similar modification.

The join inducing salt is a hydrate-forming salt of an inorganic acid, sufficiently soluble in water to yield at least 10% and preferably 30% solutions, the aqueous concentrated solutions being capable of dissolving the synthetic acrylonitrile polymer from which the pellicle is prepared at some temperature up to the boiling point of the salt solution (for example from 0 to 175° C., and generally from 20 to 90° C.). Solubility is readily determined by placing 0.1 gram of the finely divided polymer in 10 ml. of concentrated aqueous salt solution and stirring the mixture, with heating, if necessary, and observing whether the polymer balls up to a coherent mass and/or passes into solution. Soluble low molecular weight polymers tend to pass rapidly into solution, while soluble high molecular weight polymers absorb the salt solution and coalesce before slowly passing into solution.

Among the salts which meet the above definition are included ammonium thiocyanate, lithium thiocyanate, lithium iodide, lithium bromide, sodium thiocyanate, sodium iodide, sodium thiosulfate, potassium thiocyanate, magnesium chloride, magnesium thiocyanate, cupric chloride, calcium thiocyanate, calcium iodide, calcium bromide, zinc iodide, zinc bromide, zinc chloride, ferric nitrate, ferric chloride, ferrous sulfate, cadmium chloride, cadmium iodide, barium chloride, cobaltous chloride, and the like. In general these salts are found among the water-soluble thiocyanates, iodides, bromides, and chlorides of Group I and II metals of atomic numbers 3 to 48 or compatible mixtures of these salts. The preferred salts are the thiocyanates and chlorides. The preferred cations are ammonium, potassium, sodium, lithium, calcium, magnesium, zinc and ferric iron.

While the join-inducing salt when in concentrated aqueous solution must be capable of dissolving the acrylonitrile polymer, it is applied to the fiber batt in the aqueous carrier at a concentration, which under the conditions of application has little, or preferably no solvent action upon the fiber. As the liquid carrier is evaporated, the capillary forces at the points of fiber intersection tend to concentrate the join-inducing salt. Thus when the join is made by application of heat upon the substantially dry batt, the action of the salt is concentrated at the points of crossing and the major length of the fiber is unaffected.

The following examples are cited to illustrate the invention. They are not intended to limit it in any manner.

EXAMPLE 1

Three grams of 5/8 inch, 3 denier per filament staple produced from a polymer containing 94% acrylonitrile and 6% methylacrylate and drawn four times its extruded length is suspended in a 6 liter aqueous solution containing 3 grams of sodium carboxymethyl cellulose. The suspension is dispersed on a Rice-Barton "Dyno" pulper having two five-inch concave discs countercurrently stirring at 5000 revolutions per minute at opposite ends of a 5 gallon reservoir. Homogeneity is attained after 2 minutes. Thereafter the aqueous dispersion is filtered over an 8" x 8" square of 80 mesh screen, producing a randomly disposed mat or waterleaf of fibers. A vacuum of 350 mm. is employed to facilitate moisture removal and to avert bubble entrainment. The waterleaf is gently showered with 20 liters of water to wash out residual sodium carboxymethyl cellulose. 25cc. of a 10% solution of zinc bromide in water is showered upon the waterleaf. It is thereafter dried at 110° C., pressed under a pressure of 200 p.s.i. at 160° C. for a period of 30 seconds, washed with 3 liters of water to remove zinc bromide and air dried. The resulting paper-like pellicle is self-bonded, has a tensile strength of 26.4 pounds per inch, a burst strength of 85.5 pounds per square inch and a tear strength of 256 grams. All of these tests, as well as those reported hereinafter are made by the standard methods reported in TAPPI Standards.

Table I below is a summary of various other pellicle preparations employing the fiber described in Example 1 illustrating the use of various salts following the process described in Example 1.

Table I

| Exam. | Salt | Tensile Strength, lbs./in. | Elongation, Percent | Burst Strength, p.s.i. | Tear Strength, grams |
|---|---|---|---|---|---|
| 2 | Ca(CNS)₂ | 38.5 | 9.65 | 67.0 | 128.0 |
| 3 | NaCNS | 33.0 | 12.5 | 89.0 | 160.0 |
| 4 | KCNS | 32.0 | 12.2 | 89.0 | 137.6 |
| 5 | Mg(CNS)₂ | 31.6 | 8.75 | 91.0 | 179.2 |
| 6 | LiBr | 20.2 | 8.75 | 72.0 | 272.0 |

The following example illustrates the formation of a continuous sheet on a Fourdrinier machine.

EXAMPLE 7

A staple feed is prepared by beating an aqueous suspension of 5/8 inch, 3 denier per filament staple produced from polyacrylonitrile and drawn four times its extruded length, in a tugboat type beater for 15 minutes. The staple length is thereby reduced to an average of 1/4 inch. The suspending liquid also contains 0.2% by weight based on the solution of sodium lauryl sulfate (as a wetting agent) and 4% by weight calcium thiocyanate as a join-inducing salt. The suspension is fed to a small Fourdrinier machine (Franklin Institute, Philadelphia, Pa.) to produce a well-formed sheet. The machine has an 8 inch screen and is run at 6 feet per minute. As the sheet leaves the screen a squeeze roll removes excess liquid. It progresses through the drying felt over electrically heated rolls regulated at about 140° C. The product is run through a water bath to remove the salt. It is soft, pliable and strong.

A fold endurance rating of about 50,000 is observed when the pellicle of the present invention is tested on an M.I.T. Folding Endurance Tester (Manufactured by Tinius Olsen Testing Machine Company of Willow Grove, Pa.). This compares with a rating of about 1200 for a high grade of kraft paper.

The method employed in forming the batt is not critical. It is not necessary that the molecularly oriented fibers be suspended in a liquid and beaten prior to batt formation since adherence among the fibers does not depend on fibrillation as is the case in cellulose paper manufacture. However, to attain uniform distribution it is convenient to suspend a known weight of fibers or the like in a measured quantity of liquid and agitate. Machines used in paper-making such as the Hollander Beater, the Tugboat Pulper, jordans and the like are all suitable. To assist dispersion the viscosity of the liquid may be raised. This may be accomplished by supplying an additive to water such as sodium carboxymethyl cellulose, partially hydrolyzed polyvinyl acetate (such as "Elvanol 72-51" manufactured by E. I. du Pont de Nemours & Co. of Wilmington, Delaware) the condensation product of ethanolamine with mixed long chain acids (such as "Ninol 2012A," manufactured by Ninol Laboratories of Chicago, Illinois), or the like, or by employing a high viscosity liquid such as glycerine, ethylene glycol, t-butyl alcohol or the like. The optimum viscosity will vary with the type of mixing or beating, the fiber denier, and similar factors. In choosing the suspending media and thickener, therefore, care must be exercised to avoid substances which cannot be subsequently removed from the formed batt with ease since certain foreign substances such as for instance sodium carboxymethyl cellulose, even in minute concentrations, have been found to interfere with the formation of the join. In batt formation from a liquid suspension the use of staple having a length below about 1 inch with a denier per filament within the range of from about 1/10 to about 6 is preferred. However these values may vary. Fibers of mixed length and denier are suitable. Fibers as short as 3/16 inch are satisfactory. Instead of laying the batt from liquid suspension, staple, fiber or filament in wet or dry condition may be blown or dropped upon a surface, or a continuous filament may be crossed lapped on a surface. The funicular structure may be crimped or uncrimped and of circular or irregular cross section.

The join-inducing salt may be applied to the funicular feed at any stage prior to the joining step. It is sometimes convenient to add it to the beater in which the batt-forming fibers are suspended. When it is desirable to wash the batt after its formation, the salt may be added after the wash step. As previously described, the salt containing solution applied to the batt or leaf is sufficiently dilute to avoid any substantial degradation and/or solution of the fiber structure. The maximum concentration will vary according to the salt employed and the conditions under which it is applied. In general a salt solution sufficient to deposit at least about 10% by weight of salt based on the fabric weight is desirable. A batt wherein salt constitutes by weight of from about 20% to about 30% is preferred. It may be convenient to apply the salt to the batt in the form of a highly concentrated solution and thereafter reduce its concentration by washing prior to any degrading or solvent effect. Such a process is described below.

*Example 8*

1 gram of mixed 3 denier polyacrylonitrile staple with lengths of from ¼ to ⅜ inches, is suspended in a liter of water containing 0.2% sodium lauryl sulfate (sold as "Duponol" ME by E. I. du Pont de Nemours and Company of Wilmington, Delaware) as a wetting agent and 1% sodium alginate as a thickener. The suspension is filtered over a sintered glass filter. The waterleaf formed is showered with a 55% aqueous solution of calcium thiocyanate. After fifteen seconds it is washed with about one liter of water to dilute the calcium thiocyanate. The leaf is pressed at 160° C. under 300 pounds per square inch. A coherent, flexible pellicle is formed.

The join step is generally accomplished by exposing the batt of fiber bearing the join-inducing salt to elevated temperature. The optimum temperature will vary with the salt used, the amount of salt employed, the pressure upon the batt and the period of exposure. For a contact period of about thirty seconds a temperature within the range of from about 90 to about 170° C. is usually adequate. While longer heating periods when operating within this temperature range may be employed without deleterious effects, short periods of three minutes or less are preferred to facilitate commercial operations. Temperatures sufficient to induce molecular randomization cause a weakening of the product and loss of flexibility. For the production of a high strength, hard surface paper-like pellicle, a pressure within a range of from about 50 to about 200 pounds per square inch is usually employed. A lower pressure (0 to 5 lbs.) produces a bulkier product of softer surface.

The batt containing salt can be exposed to elevated temperature, preferably in a press as previously discussed, either in the moist or dry condition (i.e. after evaporation of solvent in which the join-inducing salt is applied). Generally it has been found that a stronger join results following a dry press technique.

After the join is complete, the join-inducing salt is washed from the self-bonded coherent mass. The product is a tough, flexible, coherent paper-like pellicle. It is useful in the making of paper money, as a filter media, as a non-woven fabric, in the manufacture of reinforced plastic, as body armor, condenser paper, in high frequency electronic circuits, printed electrical circluits, stencils, permanent ledger, wall-paper and the like. While the invention has been exemplified in the production of flat structures, it is obvious that shaped articles may be smilarly formed by depositing the batt or leaf over a form and thereafter applying the necessary heat and pressure. Thus seamless cones, bags, apparel and the like may be made.

The following example is cited to illustrate utility.

*Example 9*

The pellicle produced in accordance with the directions of Example 1 is folded into conical shape and employed to remove suspended solids from a hot 37% aqueous hydrochloric acid solution. Filtration is rapid. No deleterious effect upon the folded pellicle is observed.

In summary the process of the present invention comprises heating preferably on a paper-making machine, to a temperature within a range of from about 90° C. to about 170° C. a batt of a molecularly oriented fiber produced from a linear, syntheic polymer of acrylonitrile, the said batt bearing at the points of fiber intersection a join-inducing salt as previously defined, which salt is originally applied to the said fiber at a concentration at which it is substantially innocuous to the said fiber. The product may be conveniently defined as a paper-like pellicle of a mass of self-bonded, molecularly oriented fiber produced from a linear, synthetic polymer of acrylonitrile, the said fiber bridged between points of fiber intersection possessing substantially its "as-formed" characteristics.

Many equivalent modifications within the inventive concept will be apparent to those skilled in the art from a reading of the foregoing description without a departure from the inventive concept.

What is claimed is:

1. A synthetic paper sheet composed of a batt consisting essentially of a mass of reticulated molecularly oriented fiber, the said fiber being composed of a fiber-forming linear synthetic fiber produced from a linear synthetic polymer of acrylonitrile, the said fibers being self-bonded only at the points where the fibers intersect each other, the self-bond having been accomplished by a solution of a join-inducing inorganic salt from the group consisting of the water-soluble thiocyanates, iodides, bromides, and chlorides of groups I and II metals of atomic numbers 3 to 48, the said solution having been originally applied to the said fiber at a concentration at which it is substantially innocuous to the said fiber and thereafter having been heated to increase its concentration, those portions of the fibers between the points of fiber intersection possessing substantially the same physical and chemical characteristics as they possessed prior to the formation of the bonds.

2. The article of claim 1 wherein the polymer is a copolymer.

3. The article of claim 2 wherein the polymer is a copolymer containing 94% acrylonitrile and 6% methyl-acrylate.

4. The article of claim 1 wherein the polymer is polyacrylonitrile.

5. A process of making a high strength paper-like pellicle of a mass of self-bonded, molecularly oriented fiber produced from a linear, synthetic polymer of acrylonitrile which comprises concentrating by evaporation of solvent the dilute aqueous solution of an inorganic salt from the group consisting of the water-soluble thiocyanates, iodides, bromides, and chlorides of groups I and II metals of atomic numbers 3 to 48, the said dilute solution being applied to the said fiber at a concentration at which the said solution has substantially no solvent action upon the said fiber, the said solution migrating by capillary action to points of intersection of the said reticulated fibers during evaporation of solvent, and thereafter heating the said mass to a temperature within a range of from about 90° C. to about 170° C.

6. The process of claim 5 wherein the solution of join-inducing salt is applied to the fiber prior to batt formation.

7. The process of claim 5 wherein the solution of join-inducing salt is applied to the batt after batt formation.

8. The process of claim 5 wherein the heating is performed with the batt under a pressure of from about 50 to about 200 pounds per square inch.

9. The process of claim 8 wherein the heating under pressure is applied to the wet batt.

References Cited in the file of this patent

UNITED STATES PATENTS

| | | |
|---|---|---|
| 2,046,750 | Mason et al. | July 7, 1936 |
| 2,198,269 | Linzell et al. | Apr. 23, 1940 |
| 2,285,490 | Broderick | June 9, 1942 |
| 2,338,602 | Schur | Jan. 4, 1944 |
| 2,426,719 | Watkins | Sept. 2, 1947 |
| 2,436,926 | Jacobson | Mar. 2, 1948 |
| 2,477,000 | Osborne | July 26, 1949 |
| 2,491,471 | Arnold | Dec. 20, 1949 |
| 2,522,527 | Manning | Sept. 19, 1950 |
| 2,526,125 | Francis | Oct. 17, 1950 |
| 2,535,690 | Miller et al. | Dec. 26, 1950 |
| 2,577,763 | Hoxie | Dec. 11, 1951 |
| 2,626,214 | Osborne | Jan. 20, 1953 |
| 2,648,635 | Brown et al. | Aug. 11, 1953 |
| 2,670,268 | Stanton et al. | Feb. 23, 1954 |
| 2,689,199 | Pesce | Sept. 14, 1954 |
| 2,692,183 | Ericks | Oct. 19, 1954 |
| 2,730,479 | Gibson | Jan. 10, 1956 |
| 2,734,001 | Mecklenburgh | Feb. 7, 1956 |
| 2,810,646 | Wooding et al. | Oct. 22, 1957 |

FOREIGN PATENTS

| | | |
|---|---|---|
| 146,442 | Australia | May 12, 1952 |
| 626,518 | Great Britain | July 15, 1949 |

OTHER REFERENCES

Horsey: Paper Trade Journal, July 24, 1947, pages 52–56.